United States Patent

[11] 3,607,020

[72] Inventor William Novis Smith, Jr.
 Exton, Pa.
[21] Appl. No. 21,214
[22] Filed Mar. 19, 1970
[45] Patented Sept. 21, 1971
[73] Assignee Foote Mineral Company
 Exton, Pa.

[54] PREPARATION OF LITHIUM HEXAFLUOROPHOSPHATE
 18 Claims, No Drawings
[52] U.S. Cl. .................................................. 23/107,
 23/88, 23/50 R
[51] Int. Cl. .................................................. C01b 25/28
[50] Field of Search .................................... 23/50, 88, 107

[56] References Cited
UNITED STATES PATENTS

| | | | |
|---|---|---|---|
| 3,380,803 | 4/1968 | Jache et al. | 23/88 |
| 3,401,013 | 9/1968 | Roklp et al. | 23/107 |
| 3,463,605 | 8/1969 | White et al. | 23/50 R |
| 3,420,620 | 1/1969 | Mesmer | 23/107 X |

OTHER REFERENCES

Kemmitt et al., " Journal of the Chemical Society," 1963, pp. 4408– 4413.

Muetterties et al., " Journal of Inorganic & Nuclear Chemistry," Vol. 16, 1960, pp. 52– 59.

*Primary Examiner*—Herbert T. Carter
*Attorney*—Howson and Howson

ABSTRACT: Lithium hexafluorophosphate is prepared by reacting lithium fluoride with phosphorus pentafluoride in an inert organic solvent.

PREPARATION OF LITHIUM HEXAFLUOROPHOSPHATE

This invention relates to the preparation of lithium hexafluorophosphate. More particularly, it relates to the preparation of lithium hexafluorophosphate in an inert organic solvent without the requirement of high temperature and pressure.

Lithium hexafluorophosphate has been prepared by reacting phosphorus pentafluoride with lithium fluoride in the absence of a solvent and with the use of heat and pressure, J. H. Simmons, "Fluorine Chemistry," Vol. I (1950), pp. 164–166, Academic Press, Inc., N.Y., N.Y. In such a process, the reaction product, lithium hexafluorophosphate, forms on the surface of the lithium fluoride producing a coating on the lithium fluoride which prevents further reaction with the phosphorus pentafluoride. As the result of this coating of lithium hexafluorophosphate on the lithium fluoride reactant, the process is inefficient, producing low yields and leaving unreacted lithium fluoride.

U.S. Pat. No. 3,380,803 describes a process for preparing lithium hexafluorophosphate in which red phosphorus and lithium fluoride are reacted in the presence of hydrogen fluoride in a closed vessel at temperatures of about 200° C. under autogenous pressure. Another process for preparing lithium hexafluorophosphate is described in an article by Kemmitt et al. appearing in *Journal of the Chemical Society* (1963) part 4, pp. 4408–4413 where phosphorus pentafluoride is reacted with lithium fluoride in anhydrous hydrogen fluoride at 25° C. in a steel bomb. Stacey, Tatlow and Sharp in their book, *Advances in Fluorine Chemistry*, Vol. 5, (1965) pp. 208–215 also disclose a method for preparing lithium hexafluorophosphate by reacting lithium fluoride and phosphorus pentafluoride in hydrogen fluoride at 25° C. under autogenous pressure.

These prior art processes are inefficient since they do not utilize all of the lithium fluoride added to the process and require recrystallization of the reaction mass to obtain the product in good purity. Those processes which require the use of hydrogen fluoride and high temperatures and pressure to complete the reaction are also undesirable due to the costs involved.

It is an object of this invention to provide a process for the preparation of lithium hexafluorophosphate in an inert organic solvent which can be completed at ambient temperature and pressure, is efficient, produces a high yield of the desired product and is simple and economical to operate.

The method for preparing lithium hexafluorophosphate according to this invention comprises reacting lithium fluoride with phosphorus pentafluoride in an inert organic solvent selected from the group consisting of (a) saturated lower alkyl ethers of the formula ROR' wherein R and R' each contain from one to four carbon atoms, (b) lower alkyl esters of lower aliphatic saturated monocarboxylic acids of the formula RCOOR', wherein R can be H or from one to four carbon atoms and R' contains from one to four carbon atoms, and (c) mixtures of (a) and (b) in any proportion, to provide lithium hexafluorophosphate.

The lithium fluoride employed in the reaction is utilized in the form of a powder. Lithium fluoride powder typically has a particle size of about minus 100 mesh or finer.

The phosphorus pentafluoride reactant is employed in the form of a gas having a concentration of from about 3 to about 100 percent, by weight, of phosphorus pentafluoride. The phosphorus pentafluoride is added to the reaction simply by bubbling the gas into or over the reaction mixture.

The method of the present invention is carried out in an inert organic solvent selected from the group consisting of (a) saturated lower alkyl ethers of the formula ROR' wherein R and R' each contain from one to four carbon atoms, (b) lower alkyl esters of lower aliphatic saturated monocarboxylic acids of the formula RCOOR', wherein R can be H or from one to four carbon atoms and R' contains from one to four carbon atoms, and (c) mixtures of (a) and (b) in any proportion. Suitable alkyl ether solvents include dimethyl ether, diethyl ether, dipropyl ether, dibutyl ether, butyl methyl ether, butyl ethyl ether, ethyl isobutyl ether and ethyl isopropyl ether. Suitable ester solvents include methyl formate, ethyl formate, methyl acetate, ethyl acetate, butyl acetate, butyl propionate, butyl butyrate and ethyl butyrate. The solvent selected is characterized by the fact that the lithium fluoride reactant is generally insoluble in the solvent; the phosphorus pentafluoride reactant is soluble in the solvent; and the lithium hexafluorophosphate product is reasonably soluble in the solvent system. Diethyl ether is the preferred solvent.

The reaction proceeds according to the following equation:

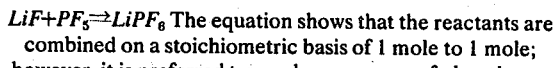

$LiF + PF_5 \rightleftharpoons LiPF_6$ The equation shows that the reactants are combined on a stoichiometric basis of 1 mole to 1 mole; however, it is preferred to employ an excess of phosphorus pentafluoride. Thus, at least 1 mole of phosphorus pentafluoride will be used per mole of lithium fluoride, and the amount reacted may be as high as the amount required to saturate the solvent with phosphorus pentafluoride under the conditions of the reaction. However, under the preferred conditions, no advantage is to be gained by using more than about 2 moles of phosphorus pentafluoride per mole of lithium fluoride.

The reaction proceeds at a temperature of from about 0° to about 50° C., preferably from about 10° to about 30° C. under ambient pressure.

As is generally the case in reactions involving lithium compounds, it is preferred to carry out the reaction in an inert atmosphere; that is, under an atmosphere free of oxygen and water vapor such as is provided by an atmosphere of argon, nitrogen and other well known inert gases. Nitrogen and argon are the preferred inert gases in this process.

In the preferred embodiment of this invention, the lithium fluoride is first added to the inert solvent in which it is insoluble, forming a slurry. The lithium fluoride reactant should be present in the inert solvent in a concentration of at least about 3 percent, preferably about 33 percent, by weight, based on the weight of the solvent system, for the reaction with the phosphorous pentafluoride. The phosphorus pentafluoride gas is then added to the lithium fluoride slurry through a slow, gradual addition rather than adding the stoichiometric requirement of phosphorus pentafluoride rapidly. In the reaction, lithium hexafluorophosphate forms on the surface of the particles of lithium fluoride, thereby effectively removing the lithium fluoride reactant from the process. However, as stated above, in the present process, the solvent system for the reaction is selected so that the lithium hexafluorophosphate product is reasonably soluble therein so long as the solvent is not saturated with phosphorous pentafluoride. Thus, as the lithium hexafluorophosphate forms, it dissolves in the solvent to provide available lithium fluoride to react with additional phosphorus pentafluoride as it is added to the reaction mixture.

It can, therefore, be generally stated that the phosphorus pentafluoride is added gradually in an amount at least substantially sufficient to react with the available lithium fluoride reactant present in the solvent, and yet not exceed an amount required to saturate the solvent system with phosphorus pentafluoride.

While not a critical part of this invention, it has been found that while the lithium hexafluorophosphate has reasonable solubility in the solvent system selected for the reaction, it is only slightly soluble in a solvent-phosphorus pentafluoride complex formed by saturating the solvent system with phosphorus pentafluoride. For this reason, in a preferred embodiment of this invention, after the reaction between the lithium fluoride and phosphorus pentafluoride has gone to completion, an additional amount of phosphorus pentafluoride, sufficient to saturate the solvent system with phosphorus pentafluoride, in practice found to be at least about 25 percent in excess, on a molar basis, of the stoichiometric amount of phosphorus pentafluoride required for the reaction, is added to the solvent system. This excess phosphorus pentafluoride forms a coordination complex with the solvent in which the lithium hexafluorophosphate is insoluble. This causes substantially all of the lithium hexafluorophosphate to precipitate from the solution, in which form it is easily recovered in high yield, as by filtration, thereby facilitating the recovery of a maximum yield of lithium hexafluorophosphate in high purity.

The lithium hexafluorophosphate prepared by this invention finds use as an electrolyte in lithium batteries and as a cationic polymerization agent.

This invention may be more fully illustrated by the following examples.

EXAMPLE 1

A three-necked round bottom flask equipped with a stirrer, thermometer and a gas inlet tube is flushed with argon followed by the addition of 75 ml. of diethyl ether and 26 g. of lithium fluoride to the flask. A slurry is formed which is stirred and cooled to maintain a temperature of 25° C. while 200 g. of phosphorus pentafluoride is added over a 4 hour period. The reaction mixture is then filtered. The solid recovered is washed with 50 ml. of benzene and then with 50 ml. of pentane. The white powder is dried under a vacuum for 2 hours at 0.2 mm. Hg at 30° C. The lithium hexafluorophosphate weighs 141 g. and analyzes 99.6 percent pure by gravimetric precipitation of the hexafluorophosphate anion for a yield of 93 percent.

EXAMPLE 2

Following the procedure of example 1, 26 g. of lithium fluoride and 100 ml. of diethyl ether are added to the flask. 235 g. of phosphorus pentafluoride is added to the flask over a 6 hour period while the temperature of the flask is maintained at 10° to 20° C. The reaction mixture is then filtered. The solid recovered is washed with 50 ml. of benzene and 50 ml. of pentane. The white powder is dried under a vacuum at 0.2 mm. Hg at 35° C. for 1 hour. 135 g. of lithium hexafluorophosphate, 99.1 percent pure, for a yield of 89 percent is recovered.

EXAMPLE 3

Following the procedure of example 1, 26 g. of lithium fluoride and 100 ml. of diethyl ether are added to the flask. 245 g. of phosphorus pentafluoride is added to the flask over a 5 hour period while the temperature of the flask is maintained at 20° to 30° C. The reaction mixture is stirred an additional 16 hours, filtered and the filter cake is washed with 50 ml. of benzene followed by 50 ml. of pentane. The white powder is dried under vacuum at 0.2 mm. Hg. at 30° C. for 1 hour. 14 g. of lithium hexafluorophosphate, 99.4 percent pure, for a yield of 93 percent is recovered.

EXAMPLE 4

Following the procedure of example 1, 13 g. of lithium fluoride and 35 ml. of diethyl ether are added to the flask. 126 g. of phosphorus pentafluoride is added to the flask over a 4½ hour period while the flask is maintained at 20° to 25° C. The reaction slurry is filtered and the white solid recovered is washed with 50 ml. of benzene followed by 50 ml. of pentane and dried under a vacuum at 0.2 mm. Hg at 30° C. for 2 hours. 74.8 g. of lithium hexafluorophosphate, 99.5 percent pure, for a yield of 98.5 percent is recovered.

EXAMPLE 5

Following the procedure of Example 1, 26 g. of lithium fluoride and 75 ml. of methyl formate are added to the flask. 200 g. of phosphorus pentafluoride is added to the flask over a 4 hour period while the temperature of the flask is maintained at 10° to 20° C. The reaction mixture is filtered. The solid recovered is washed with 50 ml. of benzene and 50 ml. of pentane. The white powder is dried under a vacuum at 0.2 mm. Hg at 30° C. for 1 hour. 104 g. of lithium hexaflurophosphate, 99 percent pure, for a yield of 93 percent is recovered.

Having thus described this invention, what is claimed is.

1. A process for preparing lithium hexafluorophosphate which comprises reacting a slurry of lithium fluoride in an inert organic solvent selected from the group consisting of (a) saturated lower alkyl ethers of the formula ROR' wherein R and R' each contain from one to four carbon atoms, (b) lower alkyl esters of lower aliphatic saturated monocarboxylic acids of the formula RCOOR' wherein R can be H or from one to four carbon atoms and R' contains from one to four carbon atoms, and (c) mixtures of (a) and (b) in any proportion, with phosphorous pentafluoride to provide lithium hexafluorophosphate.

2. The method of claim 1 wherein the amount of phosphorus pentafluoride employed is in excess of that stoichiometrically required for reaction with the lithium fluoride.

3. The method of claim 2 wherein from about 1 to about 2 moles of phosphorus pentafluoride are used per mole of lithium fluoride.

4. The method of claim 1 wherein the lithium fluoride is present in the inert solvent in a concentration of at least about 3 percent, by weight, based on the weight of the solvent system.

5. The method of claim 1 wherein the reaction is carried out at a temperature of from about 0° to about 50° C.

6. The method of claim 5 wherein the reaction is carried out at a temperature of from about 10° to about 30° C. under ambient pressure.

7. The method of claim 1 wherein the solvent is diethyl ether.

8. The method of claim 1 wherein the solvent is a mixture of diethyl ether and methyl formate.

9. The method of claim 1 wherein the lithium fluoride is first added to the inert organic solvent, followed by gradually adding the phosphorus pentafluoride to the reaction mixture, the addition of phosphorus pentafluoride being an amount at least substantially sufficient to react with the available lithium fluoride.

10. The method of claim 9 wherein the amount of phosphorous pentafluoride added during the reaction with lithium fluoride does not exceed the amount required to saturate the solvent system with phosphorus pentafluoride.

11. The method of claim 9 wherein the reaction is carried out at a temperature of from about 0° to about 50° C.

12. The method of claim 9 wherein the reaction is carried out at a temperature of from about 10° to about 30° C. under ambient pressure.

13. The method of claim 9 wherein the solvent is diethyl ether.

14. The method of claim 9 wherein the solvent is a mixture of diethyl ether and methyl formate.

15. The method of claim 1 wherein the product is recovered through precipitation of the lithium hexafluorophosphate from the reaction mixture by adding sufficient phosphorus pentafluoride to the reaction system to at least saturate the solvent system with phosphorus pentafluoride.

16. The method of claim 15 wherein the precipitating phosphorus pentafluoride is added in an amount at least about 25 percent in excess, on a molar basis, of the stoichiometric amount of phosphorus pentafluoride required for the reaction with the lithium fluoride 17. The method of claim 9 wherein the product is recovered through precipitation of the lithium hexafluorophosphate from the reaction mixture by adding sufficient phosphorus pentafluoride to the reaction system to at least saturate the solvent system with phosphorus pentafluoride.

18. The method of claim 17 wherein the precipitating phosphorus pentafluoride is added in an amount at least about 25 percent in excess, on a molar basis, of the stoichiometric amount of phosphorous pentafluoride required for the reaction between the lithium fluoride and the phosphorus pentafluoride.